Sept. 2, 1930.  M. KRUSE  1,774,926
LIFTING JACK FOR MOTOR VEHICLES AND OTHER VEHICLES
Filed Oct. 21, 1929
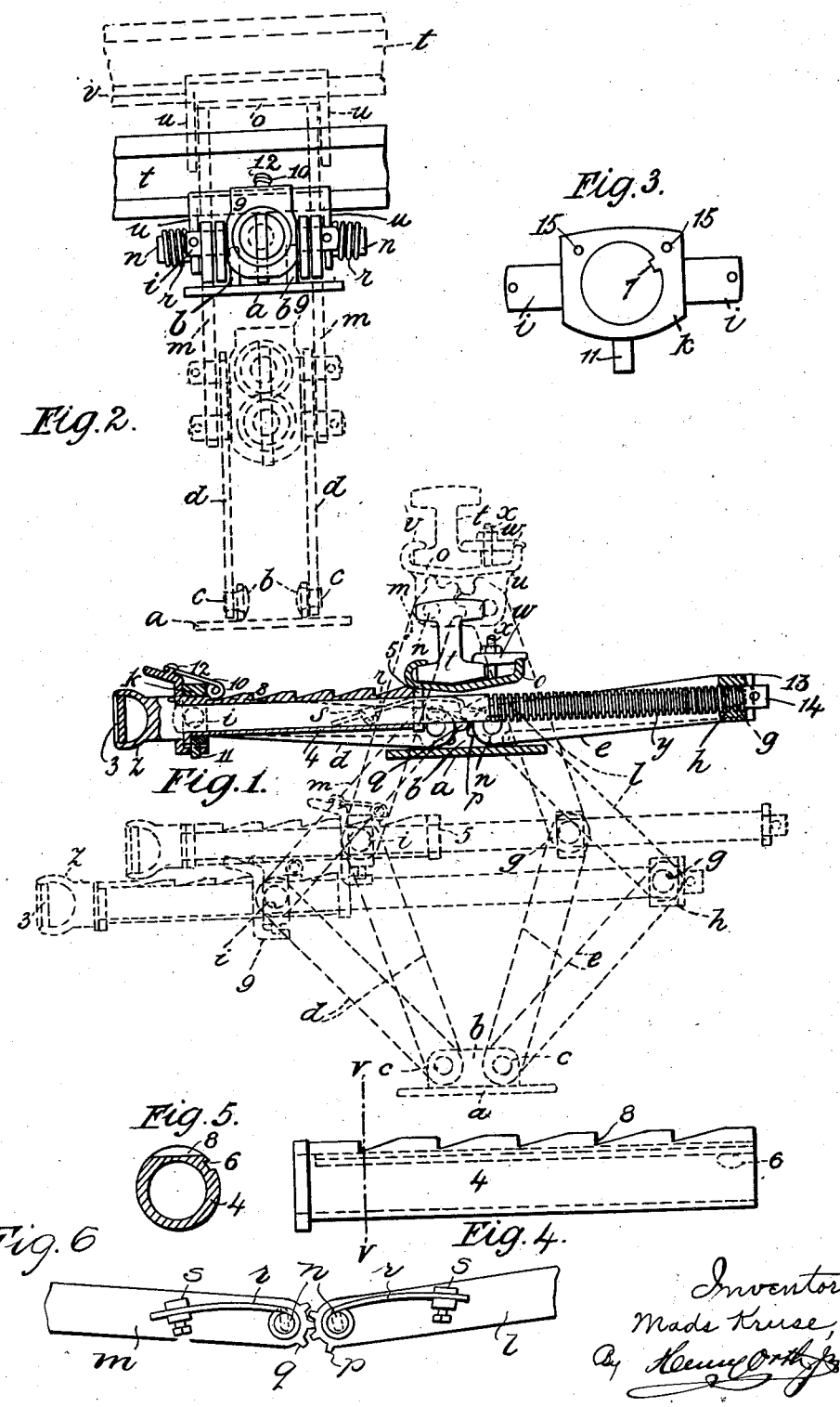

Patented Sept. 2, 1930

1,774,926

UNITED STATES PATENT OFFICE

MADS KRUSE, OF SNARESBROOK, LONDON, ENGLAND

LIFTING JACK FOR MOTOR VEHICLES AND OTHER VEHICLES

Application filed October 21, 1929, Serial No. 401,232, and in Great Britain August 21, 1928.

This invention relates to lifting jacks, for motor vehicles and other vehicles, of the kind permanently attached to an axle of, or under, the vehicle and adapted, when not required, to be folded up or raised off the ground, and the object of the invention is to produce a jack of this kind which folds up into a very small space, and is, nevertheless, very efficient, strong, easily operated, and cheap to manufacture.

The kind of lifting jack to which the invention relates comprises a base or foot, a plurality of toggle levers, of which two or more are connected at their ends remote from their common pivots to the said base and the other two or more levers are connected at their corresponding ends directly or indirectly (such as by a bracket or clip) to the axle or other part of the vehicle, a nut mounted on or integral with the common pivot of one pair of levers, a collar mounted on or integral with the common pivot of the other pair of levers, a screw engaging in the nut and revoluble in but incapable of axial movement in, the collar and means for rotating the screw whereby the toggle levers may be collapsed when not required or extended when it is desired to jack-up.

According to this invention and in order to avoid having to turn the screw a great number of times, the screw is provided with a sleeve incapable of revolving but slidable axially in the said collar, the said sleeve has a number of teeth or recesses and the collar to which one pair of levers is pivoted has a detent engageable in one or other of the said recesses. The screw has a plain part revoluble in but incapable of axial movement in the said sleeve and the screw also has a head with a recess or the like at one end for engagement with a key or spanner, the screw-threaded portion of the screw engaging in the said nut. Or the sleeve may be dispensed with if that part of the screw, unprovided with the screw thread, be made with a number of annular grooves of angular section like the teeth of a saw for being engaged by the detent. Elastic means are provided for causing the toggle levers to collapse and normally retain the base or foot off the ground, and locking means are also provided for maintaining the toggle levers in an extended condition with the base near or on the ground when the jack is to be used.

And in order that the invention may be readily understood and easily carried into effect, reference will be made to the accompanying drawings, of which:—

Figure 1 is a sectional side elevation of one construction of lifting jack adapted to be clamped to the axle of a motor vehicle.

Figure 2 is an end elevation thereof.

Figure 3 is an end view of a collar having gudgeons to receive a pair of toggle levers and furnished in the bore with a feather adapted to engage in a feather way in a sleeve in which the plain part of the screw is rotatably mounted.

Figure 4 is a side elevation of the said sleeve.

Figure 5 is a section on the line V—V, Figure 4 and Figure 6 is a detail of the arrangement of the return springs.

In carrying the invention into effect and as shown in Figures 1 and 2 of the accompanying drawings, the base or shoe $a$ consists of a substantially flat horizontal flange and a pair of parallel rectangular and upwardly projecting lugs $b$ each having two transverse holes situated a short distance apart and made equidistant from the base. If desired, the lugs may be connected to the shoe by a ball-and-socket joint or the like to allow of slight angular movement to suit inequalities of the ground and prevent undue stress in such a case where the ground is not level. Pivotally mounted on rivets or studs $c$ in these holes aforesaid are two pairs of toggle levers $d\,d$ and $e\,e$ and the upper end of each lever of the pair marked $e\,e$ is pivotally connected to a gudgeon $g$ on a nut $h$ and the corresponding end of each of the other pair of toggle-levers $d\,d$ is pivotally connected, as shown in Figures 1 and 3, to a gudgeon $i$ on a collar $k$. Similarly, there are two pairs of upper toggle levers $l\,l$ and $m\,m$ of which the outer or lower ends of the pair $l\,l$ are pivotally connected to the gudgeons $g$ of the nut $h$ and the outer ends of the other pair of levers $m\,m$ are pivotally connected to the collar $k$. The upper or inner ends of the upper pairs of toggle levers $l\ l$ and $m\ m$ are pivotally mounted on studs or gudgeons $n$ arranged close together on a clip $o$ for fixing on the axle of the vehicle and the inner or upper ends of the said toggle levers $l$ and $m$ are formed with meshing toothed quadrants marked $p$ and $q$, respectively, springs $r$ being provided which tend to cause the toggle levers $l$ and $m$ to separate and thus assume the horizontal or folded condition. As shown, the spring $r$ at each side of the jack is fixed at each end of a clip $s$ (of which only one is shown in dotted lines) to a toggle lever $l$ and $m$, respectively, and is coiled around the gudgeons $n$. The axle such as marked $t$, of a motor vehicle is as usual of substantially H section and the clip $o$ is provided on each side with a lug $u$ having two holes for the pivots or studs $n$ of the toggle levers $l\ l$ and $m\ m$. A table or platform of the clip on which the lower side of the axle $t$ rests, has a fixed or integral hook-shaped jaw $v$ to partly embrace one side of the lower flange of the axle and a loose jaw $w$ is fixed to the platform by studs screws or bolts $x$ to embrace the other side of the axle flange.

A screw device, for drawing the toggle levers together so as to cause them to assume a more or less upright position, thereby raising the axle and causing the wheel to be lifted off the ground, comprises a screw $y$, screw-threaded at one end, plain towards the other end and terminating in a head $z$. The head is suitably provided with a recess having a cross-bar 3 therein or it is made square or otherwise for being engaged by a key or spanner or both. Mounted on the plain part of this screw is a sleeve 4 (Figures 1, 4 and 5) which is slidable in the collar $k$ and in which the screw $y$ may turn freely but relative axial movement between the screw $y$ and the sleeve 4 is prevented by the sleeve engaging at one end the head $z$ of the screw and at the other end a collar 5 (Figure 1) fixed on the screw $y$ adjacent to the end of the said sleeve. The sleeve 4 is provided with a feather-way 6 (Figures 4 and 5) and this sleeve engages slidably in the collar $k$ (Figures 1 and 3) to which the pairs of levers $d$ and $m$ are hinged, the said collar being provided with a feather or key 7 which engages in the feather-way 6 in the sleeve. The screwthreaded portion of the screw $y$ engages in the nut $h$ to which the other two pairs of levers $e$ and $l$ are hinged. In order that the toggle levers may be extended so that the shoe $a$ touches or nearly touches the ground preparatory to the jacking-up operation in order to avoid rotating the screw many times and, consequently, saving a good deal of time and labour, the shoe $a$ is lowered by pressing thereon with the foot or the key or spanner and means are provided for temporarily locking the sleeve 4 to the lower collar $k$ uniting the upper toggle levers $m$ to the toggle levers $d$. For this purpose, the sleeve 4 is provided with a number of recesses or serrations 8 into any one of which is adapted to engage an annular catch or detent 9 mounted on the collar $k$ and provided with a simple bent wire spring 10, constantly pressing the detent 9 onto the sleeve 4. The detent 9 is, preferably, annular or oval so as to freely embrace the sleeve but to have sufficient play to enable it to engage with and be disengaged from recesses in the sleeve. The detent is conveniently furnished with a flange at the top and at the bottom, the latter flange being provided with a hole into which freely passes a stud 11 projecting from the collar $k$ for holding the sleeve and detent together. Or the detent 9 may be screwed or riveted to one end of a blade spring, the other end of which is similarly fixed to the collar $k$. In order to get the necessary length of the spring and yet allow of the collar and detent being very close together, the spring may be somewhat in the nature of a three quarter elliptic spring or the spring may be made in two parts riveted together but the wire spring 10, as shown fixed, by being inserted in holes 15 (Figure 3) at both ends to the collar $k$ and having its middle bend embracing a stud 12 on the detent 9, is a simpler arrangement. In order to prevent dirt and moisture from having access to the screw, each pair of levers is covered on one side by a plate or a cover suitably made of waterproof material but not shown in the drawings. The levers may be single and used in pairs, as shown, or they may be of channel section or cased-in, if desired, and the outer end of the screw is provided with a nut, or as shown, with a collar or washer 13 and a split pin 14 or the like to prevent it from being drawn out inadvertently from the nut to which the toggle levers $e$ and $l$ are hinged. After use, to release the jack and allow it to fold up against the axle, it is only necessary to remove the key or spanner and give the detent 9 a tap in an upward direction. This removes it from engagement with the serration 8 in the sleeve 4 and the springs $r$ on the levers $l$ and $m$ cause the latter to extend laterally. A few turns of the screw then causes the levers and the screw $y$ to assume a substantially parallel condition and the screw itself is enclosed between the levers, as shown in Figure 1.

I claim:—

1. A lifting jack for vehicles comprising a bracket for attachment to the vehicle, a base, a plurality of toggle levers connected at one end to the bracket, a plurality of toggle levers connected at one end to the base, a nut pivotally mounted on the free ends of said levers on one side of the bracket and base, a screw engaging in the said nut, means for rotating the said screw, a collar mounted on a plain part of the said screw, the free ends of the said levers on the other side of the bracket being pivotally mounted on the said collar, means for allowing axial movement of said collar on the screw, and means for locking the said collar in relation to the screw in different positions along the screw.

2. A lifting jack for vehicles, comprising a bracket for attachment to the vehicle and having pivots thereon, a base, four toggle levers pivotally connected at one end to the pivots on the said bracket, pivots on said base, said toggle levers being pivotally connected at the other end to the pivots on said base, a nut having pivots thereon, the joints of two toggle levers being mounted on the pivots of the nut, a collar having pivots thereon, the joints of two other toggle levers being mounted on the pivots of the collar, said ends of the toggle levers which are pivoted on the bracket being formed with toothed intermeshing quadrants to ensure that both levers shall always have the same degree of angularity to the vertical plane in which the bracket and base are situated, a screw engaging in said nut, means for rotating the said screw, means for allowing axial movement of the screw in relation to the collar without rotating the screw and means for locking the said collar in relation to the screw in different positions along the screw.

3. A lifting jack for vehicles, comprising a bracket for attachment to the vehicle having pivots thereon, a base having pivots thereon, toggle levers pivotally connected at one end to said pivots on the said brackets and at their opposite ends to the pivots on the said base, a nut, a joint of a toggle lever being pivoted to the nut, a screw engaging in the said nut, means for rotating said screw, a sleeve slidable but non-rotatable on one end of the screw, means for preventing relative axial movement of the screw and the sleeve including transverse serrations in the said sleeve, a collar slidable on the said sleeve and provided with pivots, the joint of a toggle lever being pivoted on the collar, a detent mounted on the said collar and adapted to engage in any one of the serrations in the said sleeve, and elastic means tending to collapse the toggle levers and retain them normally in position with the base off the ground.

4. A lifting jack for vehicles, comprising a bracket for attachment to the vehicle, a base, toggle levers pivotally connected at one end to said bracket and at their opposite end to two pivots on said base, a nut, the joint of one of the toggle levers being pivoted on the nut, a screw engaging in the said nut, means for rotating said screw, a sleeve slidable but not rotatable on one end of the said screw but permitting the screw to revolve therein, means for preventing relative axial movement of the screw and sleeve, transverse serrations in the said sleeve, a collar slidable on the said sleeve, the joint of another toggle lever being pivoted on the collar, the adjacent ends of said levers having toothed quadrants meshing with each other to ensure that both levers shall always have the same degree of angularity to the vertical plane in which the bracket and base are situated, a detent mounted on the said collar and adapted to engage in any one of the serrations to the said sleeve, and elastic means tending to collapse the toggle levers and retain them normally in position with the base off the ground.

MADS KRUSE.